US011619510B2

(12) United States Patent
Jin

(10) Patent No.: US 11,619,510 B2
(45) Date of Patent: Apr. 4, 2023

(54) APPARATUS FOR PROVIDING A DRIVING PATH AND METHOD THEREOF

(71) Applicants: Hyundai Motor Company, Seoul (KR); Kia Motors Corporation, Seoul (KR)

(72) Inventor: Geum Dan Jin, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 16/827,004

(22) Filed: Mar. 23, 2020

(65) Prior Publication Data

US 2021/0164799 A1    Jun. 3, 2021

(30) Foreign Application Priority Data

Nov. 29, 2019    (KR) .......................... 10-2019-0156586

(51) Int. Cl.
*G01C 21/36*    (2006.01)
*G01C 21/34*    (2006.01)

(52) U.S. Cl.
CPC ..... *G01C 21/3655* (2013.01); *G01C 21/3484* (2013.01)

(58) Field of Classification Search
CPC ............ G01C 21/3655; G01C 21/3484; G01C 21/343; G01C 21/3415; G01C 21/3407; G01C 21/3446
See application file for complete search history.

(56) References Cited

U.S. PATENT DOCUMENTS

| | | | | |
|---|---|---|---|---|
| 5,231,584 A | * | 7/1993 | Nimura | G01C 21/3415 340/990 |
| 5,924,075 A | * | 7/1999 | Kanemitsu | G06Q 10/047 705/6 |
| 2017/0169366 A1 | * | 6/2017 | Klein | G06Q 50/30 |
| 2018/0043884 A1 | * | 2/2018 | Johnson | B60W 30/06 |
| 2018/0172458 A1 | * | 6/2018 | Yamamoto | G01C 21/3438 |
| 2019/0147410 A1 | * | 5/2019 | Takeyama | G06Q 10/1097 705/7.21 |
| 2020/0334987 A1 | * | 10/2020 | Shoval | G06Q 10/063116 |

* cited by examiner

*Primary Examiner* — Rami Khatib
(74) *Attorney, Agent, or Firm* — Slater Matsil, LLP

(57) ABSTRACT

An apparatus for providing a driving path is provided. The apparatus includes an input device configured to receive a return need time to a departure point. The apparatus further includes a controller configured to determine whether the return need time is less than a preset time, to set a virtual destination depending on a result of the determination, to calculate a first driving time from the departure point to the virtual destination and a second driving time from the virtual destination to the departure point, to compare a sum of the first driving time and the second driving time with the return need time, and to determine whether to provide a return path to the departure point based on a result of the comparison.

20 Claims, 11 Drawing Sheets

APPARATUS FOR PROVIDING A DRIVING PATH AND METHOD THEREOF

CROSS-REFERENCE TO RELATED APPLICATIONS

This application claims priority to Korean Patent Application No. 10-2019-0156586, filed in the Korean Intellectual Property Office on Nov. 29, 2019, which application is hereby incorporated herein by reference.

TECHNICAL FIELD

The present disclosure relates to an apparatus for providing a driving path and a method thereof.

BACKGROUND

While driving a vehicle, a driver may drop off a passenger at a destination, and the driver may need to pick up the passenger again at the same place after a certain time. However, as an area prohibiting parking/stopping has recently become wider, it may be difficult to park/stop a vehicle at a certain point until the passenger is ready for pick up again.

In general, an apparatus that provides a driving path searches for and provides a path from a departure point to a destination, but a conventional apparatus that provides the driving path may not generate the path when the departure point and the destination are the same and thus does not support providing a path. Accordingly, the driver may have an inconvenience of arbitrarily driving a nearby road without receiving the path until the driver picks up the passenger again at the same place after the certain time.

SUMMARY

Embodiments of the present disclosure may solve the above-mentioned problems occurring in the prior art while advantages achieved by the prior art are maintained intact.

An embodiment of the present disclosure provides an apparatus for providing a driving path that may improve a driving convenience of a user, by searching for and providing a driving path for returning back to a departure point after a preset time, and a method for providing thereof.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for providing a driving path includes an input device that receives a return need time to a departure point, and a controller that determines whether the return need time is less than a preset time, sets a virtual destination depending on a result of the determination, calculates a first driving time from the departure point to the virtual destination and a second driving time from the virtual destination to the departure point, compares a sum of the first driving time and the second driving time with the return need time, and determines whether to provide a return path to the departure point, based on a result of the comparison.

The controller may set the virtual destination at a position spaced apart from the departure point by a predetermined distance in a direction opposite a driving direction when the return need time is less than the preset time.

The controller may set the virtual destination at one of multiple points reachable within a predetermined time from the departure point when the return need time exceeds the preset time.

The controller may set a point located at the shortest distance from the departure point among the points reachable within the predetermined time from the departure point as the virtual destination.

The controller may advise that the return path cannot be provided to the departure point when the sum of the first driving time and the second driving time exceeds the return need time.

The controller may provide the return path to the departure point when the sum of the first driving time and the second driving time is the same as the return need time.

The controller may provide as the return path a first path in which driving is performed during the first driving time from the departure point to the virtual destination and a second path in which driving is performed during the second driving time from the virtual destination to the departure point.

The controller may calculate the first driving time again until the sum of the first driving time and the second driving time is the same as the return need time when the sum of the first driving time and the second driving time is less than the return need time.

The controller may calculate the first driving time again by resetting the first path.

The controller may reset the first path by assigning a user preference as a weight.

According to an embodiment of the present disclosure, a method for providing a driving path includes receiving a return need time to a departure point, determining whether the return need time is less than a preset time and setting a virtual destination depending on a result of the determination, calculating a first driving time from the departure point to the virtual destination and a second driving time from the virtual destination to the departure point, comparing a sum of the first driving time and the second driving time with the return need time, and determining whether to provide a return path to the departure point based on a result of the comparison.

The setting of the virtual destination includes setting the virtual destination at a position spaced apart from the departure point by a predetermined distance in a direction opposite a driving direction when the return need time is less than the preset time.

The setting of the virtual destination includes setting the virtual destination at one of multiple points reachable within a predetermined time from the departure point when the return need time exceeds the preset time.

The setting of the virtual destination includes setting a point located at the shortest distance from the departure point among the points reachable within the predetermined time from the departure point as the virtual destination.

The comparing of the sum of the first driving time and the second driving time with the return need time includes advising that the return path cannot be provided to the departure point when the sum of the first driving time and the second driving time exceeds the return need time.

The comparing of the sum of the first driving time and the second driving time with the return need time further includes providing the return path to the departure point when the sum of the first driving time and the second driving time is the same as the return need time.

Providing the return path includes providing as the return path a first path in which driving is performed during the first driving time from the departure point to the virtual destination and a second path in which driving is performed during the second driving time from the virtual destination to the departure point.

The comparing of the sum of the first driving time and the second driving time with the return need time further includes calculating the first driving time again until the sum of the first driving time and the second driving time is the same as the return need time when the sum of the first driving time and the second driving time is less than the return need time.

The calculating of the first driving time again includes calculating the first driving time again by resetting the first path.

The calculating of the first driving time again includes resetting the first path by assigning a user preference as a weight.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
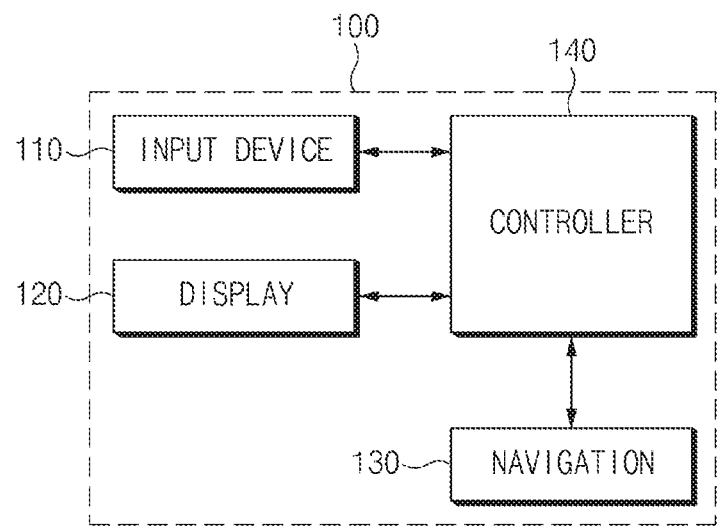
FIG. 1 is a diagram illustrating a configuration of an apparatus for providing a driving path according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of an apparatus for providing a driving path according to an embodiment of the present disclosure.

Referring to FIG. 1, an apparatus 100 for providing a driving path may include an input device no, a display 120, a navigation 130, and a controller 140.

The input device no may receive an input signal corresponding to a user's manipulation, operation, or voice, and the controller 140 may generate a control signal corresponding to the input signal. In detail, the input device no may receive a time needed for a vehicle to return (hereinafter, referred to as "a return need time") to a departure point from the user. In this case, the return need time may mean a time required from the departure point to return to the departure point. The input device no may be implemented as a scroll wheel, a button, a knob, a touch screen, a touch pad, a lever, a track ball, or the like, which may be operated by the user. Alternatively, the input device no may be implemented by at least one or a combination of a motion sensor and a voice recognition sensor for detecting a motion or voice of a passenger. According to an embodiment, the input device no may be provided on a steering wheel device and an audio video navigation (AVN) screen.

The display 120 may display an image with respect to a result determined by the controller 140. For example, when the controller 140 provides a path, the display 120 may display the path generated by the controller 140. In addition, the display 120 may be formed in a mutual layer structure or integrally with a touch sensor, and may be implemented as the touch screen integrated with the input device no. In this case, the display 120 may receive a user's command in a touch manner and may include the touch sensor.

The navigation 130 may provide the user with information about a surrounding area of an area in which the user is located in a form of a map, text, or various symbols, or may provide the path to a destination input by the user. To this end, the navigation 130 is provided with a GPS receiver to receive a current position of a vehicle, and may provide map image information, road guidance image information, road guidance audio information, or speed information of the vehicle and destination information, related to a certain area based on the current position of the vehicle. In addition, the navigation 130 may include a separate output device to provide the user with information related to an operation of the navigation 130. The output device may include a display device and a sound output device, and the display device may be integrally implemented with the display 120.

Although not illustrated, the apparatus for providing the driving path according to an embodiment of the present disclosure further includes a storage device to store at least one algorithm for performing calculation or execution of various commands for an operation of the apparatus for providing the driving path. The storage device may include at least one storage medium of a flash memory, a hard disc, a memory card, a read-only memory (ROM), a random access memory (RAM), an electrically erasable programmable read-only memory (EPEROM), a programmable read-only memory (PROM), a magnetic memory, a magnetic disk, and an optical disk.

The controller 140 may be implemented by various processing devices such as a microprocessor having a semiconductor chip or the like capable of performing the calculation or the execution of various commands, and may control an overall operation of the apparatus for providing the driving path according to an embodiment of the present disclosure.

In detail, the controller 140 may determine whether the return need time is less than a preset time, may set a virtual destination depending on a result of the determination, may calculate a first driving time from the departure point to the virtual destination and a second driving time from the virtual destination to the departure point, may compare a sum of the first driving time and the second driving time with the return need time, and may determine whether to provide a return path to the departure point, based on a result of the comparison.

To this end, the controller 140 may obtain the map image of a preset area, based on the current position of the vehicle by using the navigation 130, may link a shape of a road included in the map image, and may determine whether to provide the return path that is set by using a link. In this case, the link may include the road on which the vehicle may drive.

Hereinafter, to describe the present disclosure in more detail, the case in which the return need time to the departure point input from the user is less than the preset time will be described as an embodiment. Meanwhile, the case in which the return need time is not less than the preset time (when the return need time exceeds the preset time) will be described as another embodiment. First, the embodiment will be described with reference to FIGS. 2 to 4C.

FIGS. 2 to 4C are diagrams illustrating an operation of an apparatus for providing a driving path according to an embodiment of the present disclosure.

Figure 2:
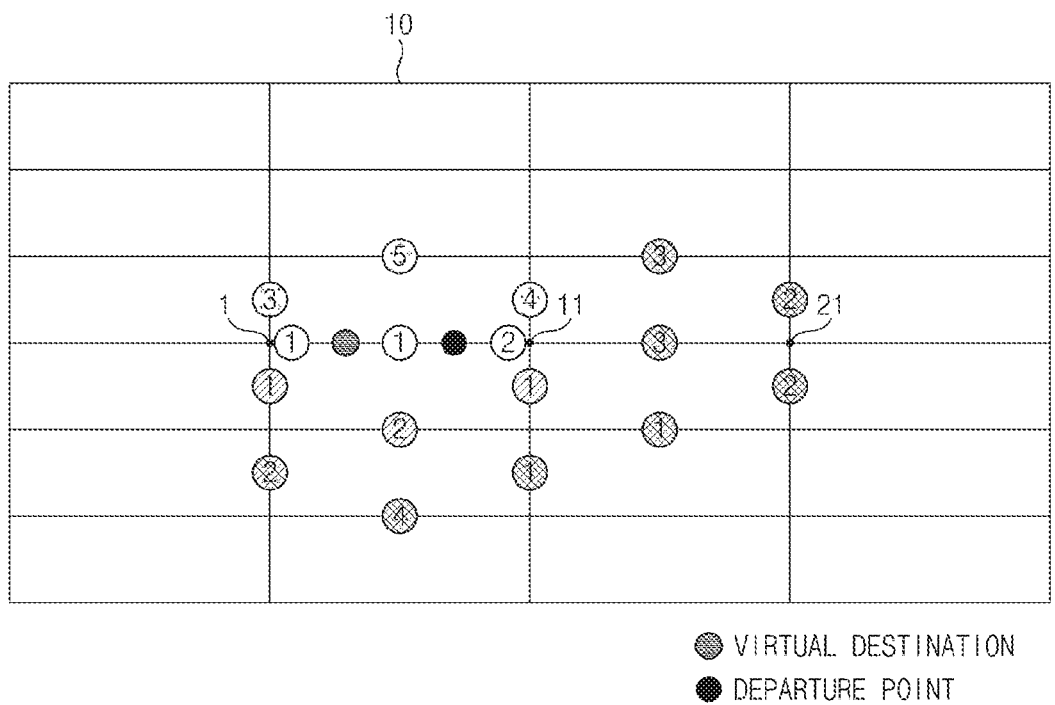
FIGS. 2 to 4C are diagrams illustrating an operation of an apparatus for providing a driving path according to an embodiment of the present disclosure.

As illustrated in FIG. 2, the controller 140 may display the shape of the road included in the map image of the preset area as a link 10, based on the current position of the vehicle. In addition, the controller 140 may calculate a needed time from a first intersection point at which links cross to a second intersection point adjacent to the first intersection point. Numbers in circles described on the links of FIG. 2 may refer to the needed time. This is not limited to the embodiment of FIG. 2, and the numbers in the circles in following drawings may mean the needed time.

For example, when the first intersection is referred to as '1', the second intersection is referred to as '11', and a third intersection is referred to as '21', the controller 140 may calculate the needed time from '1' to '11' as 4 minutes, and may calculate the needed time from '11' to '21' as 3 minutes.

In addition, the controller 140 may set the departure point on the link 10. When the return need time input from the user is less than the preset time, the controller 140 may recognize the link including the departure point and may set the virtual destination at a position spaced apart from the departure point by a predetermined distance in a direction opposite the driving direction of the vehicle. In this case, when the departure point is located on the link between the first intersection point 1 and the second intersection point 11, the controller 140 may set the virtual destination on the same link between the first intersection 1 and the second intersection 11, but may set the virtual destination at the position spaced apart from the departure point in the direction opposite the driving direction. In this case, the virtual destination may serve as a waypoint when the vehicle returns to the departure point.

The controller 140 may calculate a sum of the driving time from the departure point to the virtual destination and the driving time from the virtual destination to the departure point as a return path driving time. The controller 140 may compare the return path driving time and the return need time, and may determine whether to provide the return path, based on a result of the comparison. The controller 140 may advise that the return path to the departure point cannot be provided when the return path driving time exceeds the return need time. On the other hand, the controller 140 may provide the return path to the departure point when the return path driving time is the same as the return need time. In this case, when the controller 140 provides the return path, the controller 140 may control not to display the virtual destination. Also, when the return path driving time is less than the return need time, until the return path driving time is the same as the return need time, the controller 140 may reset the driving path from the departure point to the virtual destination such that the driving time from the departure point to the virtual destination is calculated again.

More specifically, an operation of calculating the return path driving time will be described with reference to FIGS. 3A to 4C.

The controller 140 may set the return path before calculating the return path driving time. For example, the controller 140 may set paths that turn and drive at the intersection (a point capable of turning) that meets for a first time after the driving starts from the departure point as return paths. For example, the controller 140 may set the return paths that turn in a first direction (north direction) or a second direction (south direction) from the second intersection 11 that meets for the first time after the driving starts from the departure point. In the present disclosure, turning in the first direction will be described with reference to FIG. 3A, and turning in the second direction will be described with reference to FIG. 3B.

Figure 3A:
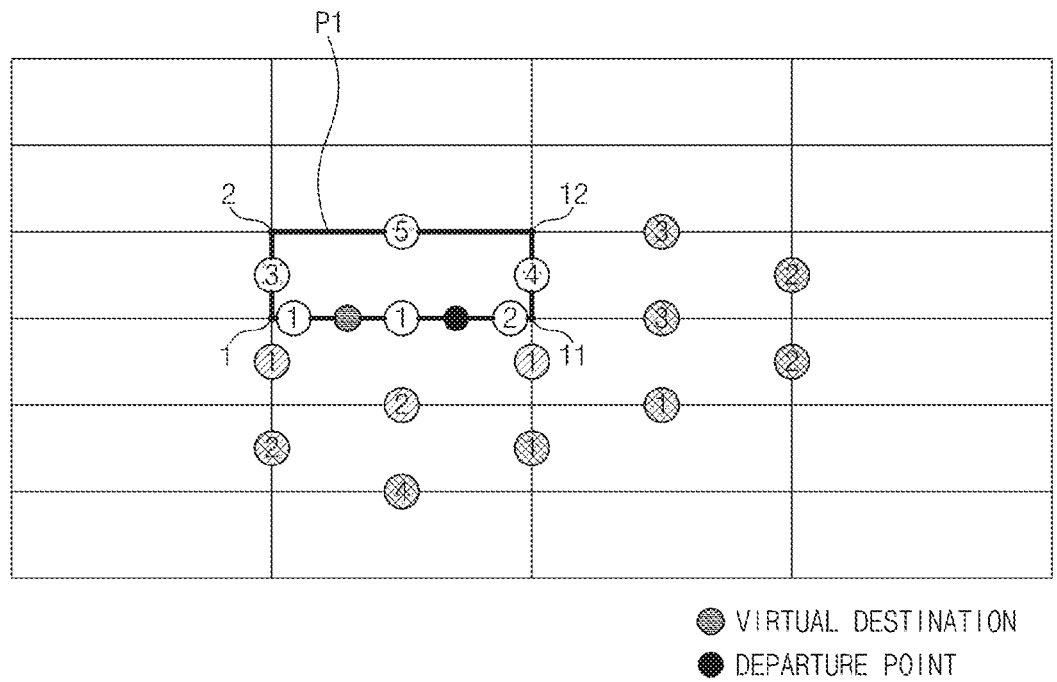

As illustrated in FIG. 3A, the controller 140 may set a return path P1 that turns in the first direction (north direction) at the second intersection 11 that first meets after the driving starts from the departure point, turns in a third direction (west direction) at a fourth intersection 12 that first meets after the turning in the first direction, turns in the second direction (south direction) at a fifth intersection point 2 that first meets after the turning in the third direction, turns in a fourth direction (east direction) from the first intersection point 1 that first meets after the turning in the second direction, and then returns to the departure point via the virtual destination after the turning in the fourth direction. In this case, the controller 140 may calculate a sum of a needed from the departure point to the virtual destination and a needed time β from the virtual destination to the departure point as the return path driving time. According to an embodiment, the controller 140 may calculate the needed time α from the departure point to the virtual destination as 15 minutes (2 minutes+4 minutes+5 minutes+3 minutes+1 minute), and the controller 140 may calculate the return path driving time as 16 minutes (15 minutes+1 minute), based on the needed time β (1 minute) from the virtual destination to the departure point.

Figure 3B:
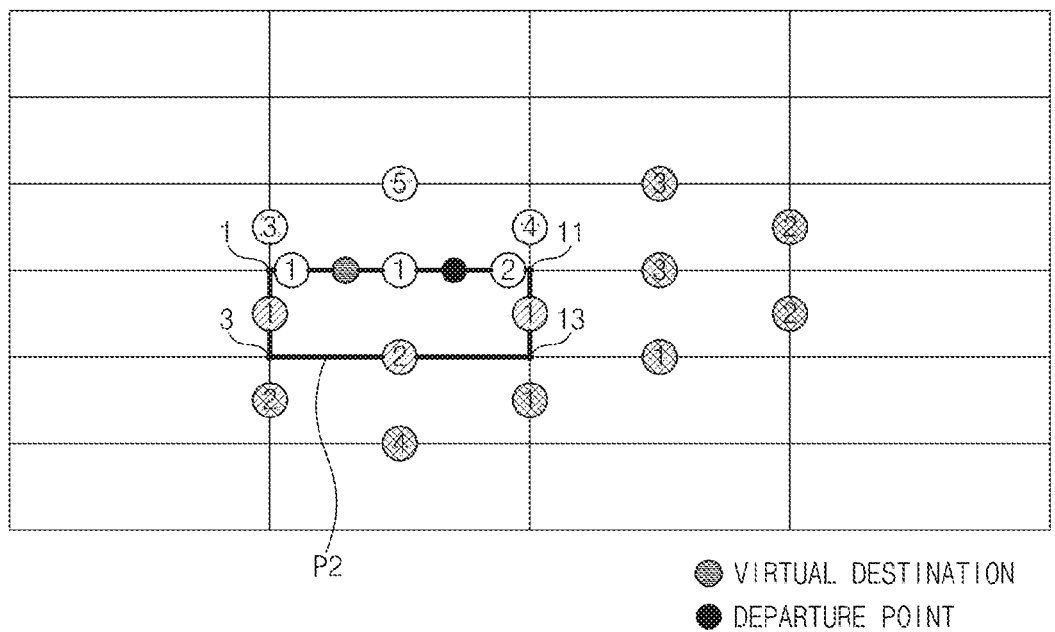

Meanwhile, as illustrated in FIG. 3B, the controller 140 may set a return path P2 that turns in the second direction (south direction) at the second intersection 11 that first meets after the driving starts from the departure point, turns in the third direction (west direction) at a sixth intersection 13 that first meets after the turning in the second direction, turns in the first direction (north direction) at a seventh intersection 3 that first meets after the turning in the third direction, turns in the fourth direction (east direction) at the first intersection 1 that first meets after the turning in the first direction, and then returns to the departure point via the virtual destination after the turning in the fourth direction. In this case, the controller 140 may calculate the sum of the needed time α from the departure point to the virtual destination and the needed time β from the virtual destination to the departure point. According to the embodiment, the controller 140 may calculate the needed time α from the departure point to the virtual destination as 7 minutes (2 minutes+1 minute+2 minutes+1 minute+1 minute), and the controller 140 may calculate the return path driving time as 8 minutes (7 minutes+1 minute), based on the needed time β (1 minute) from the virtual destination to the departure point.

When the return need time input by the user is 20 minutes, the controller 140 may determine that the return path driving time illustrated in FIGS. 3A and 3B is less than the return need time, and may recalculate the return path driving time by resetting the return path until the return path driving time is equal to the return need time. In this case, the resetting of the return path may be set by assigning a user preference as a weight. For example, when the user prefers alleyways, the return path may be reset to include the alleyways, and when the user prefers main streets, the return path may be reset to include the main streets.

As described above, the controller 140 may reset the path from the departure point to the virtual destination, and may recalculate the return path driving time. A more detailed description will be described with reference to FIGS. 4A to 4C.

Figure 4A:
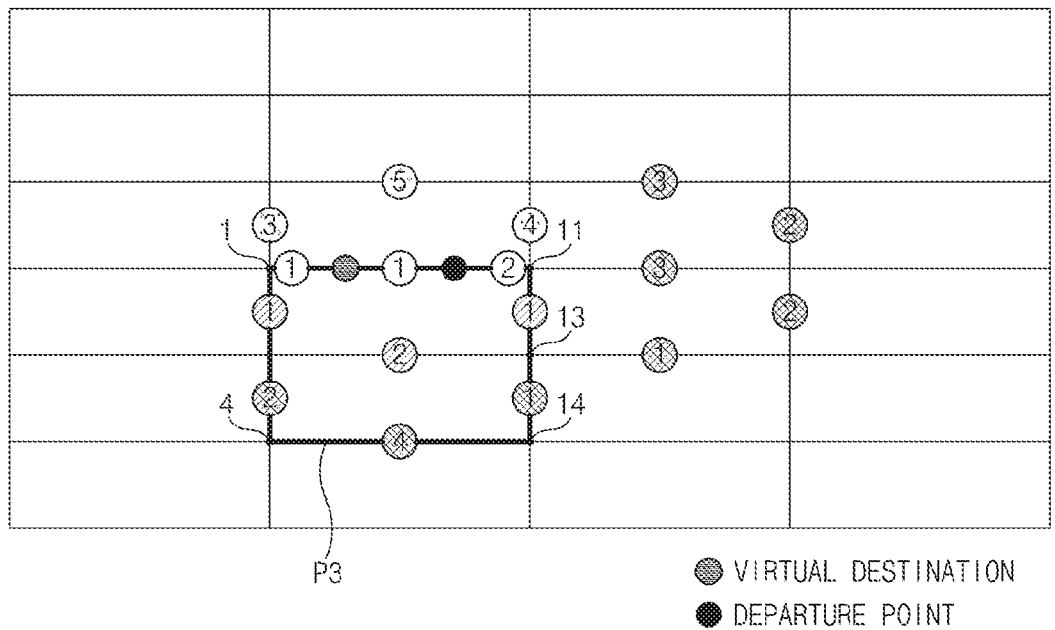

As illustrated in FIG. 4A, according to an embodiment, the controller 140 may set a return path P3 that turns in the second direction (south direction) at the second intersection 11 that first meets after the driving starts from the departure point, drives an extended link without turning in the third direction (west direction) at the sixth intersection 13 that first meets after the turning in the second direction, turns in the third direction (west direction) at an eighth intersection 14 that meets after the driving of the extended link, drives from the ninth intersection 4 that meets after the turning in the third direction to the first intersection 1 in the first direction (north direction), turns in the fourth direction (east direction) at the first intersection 1, and then returns to the departure point via the virtual destination after the turning in the fourth direction. In this case, the controller 140 may calculate the sum of the needed time α from the departure point to the virtual destination and the needed time β from the virtual destination to the departure point. According to an embodiment, the controller 140 may calculate the need time α from the departure point to the virtual destination as 12 minutes (2 minutes+1 minute+1 minute+4 minutes+2 minutes+1 minute+1 minute), and may calculate the return path driving time as 13 minutes (12 minutes+1 minute), based on the needed time β (1 minute) from the virtual destination to the departure point.

Figure 4B:
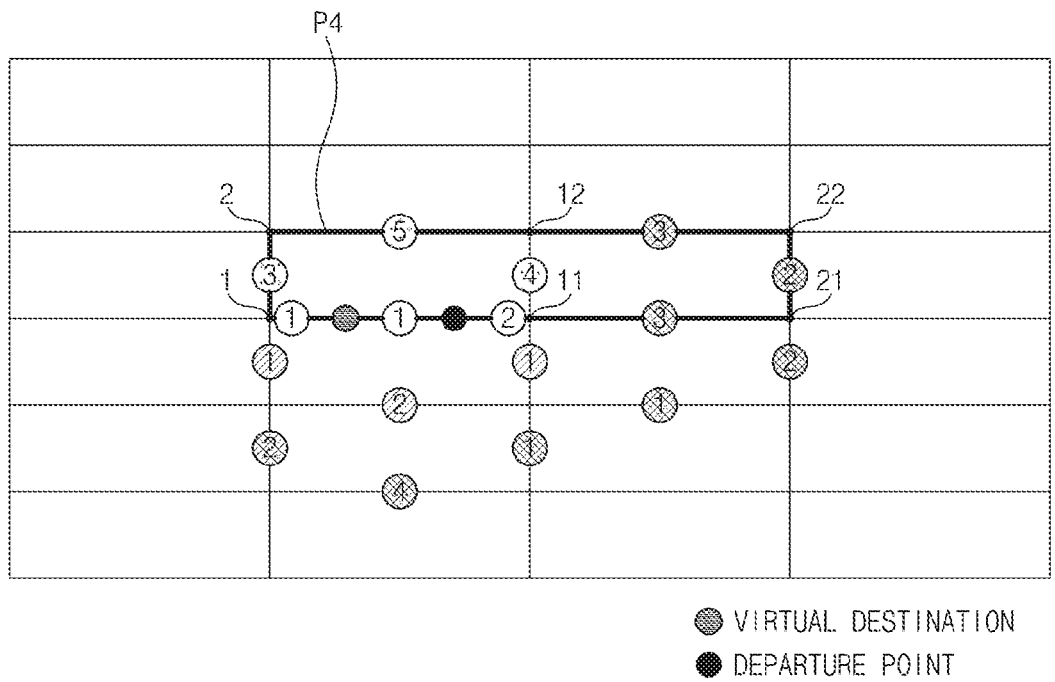

In addition, as illustrated in FIG. 4B, the controller 140 may set a return path P4 that extends a link without turning at the second intersection 11 that first meets after the driving starts from the departure point, turns in the first direction (north direction) at the third intersection 21 that first meets after the link is extended, turns in the third direction (west direction) at a tenth intersection 22 that first meets after the turning in the first direction, drives an extended link without turning at the fourth intersection 12 after turning in the third direction, turns in the second direction (south direction) at the fifth intersection 2 that meets after the driving of the extended link, turns in the fourth direction (east direction) at the first intersection 1 that meets after the turning in the second direction, and then returns to the departure point via the virtual destination after turning in the fourth direction. In this case, the controller 140 may calculate the sum of the needed time α from the departure point to the virtual destination and the needed time β from the virtual destination to the departure point. According to the embodiment, the controller 140 may calculate the needed time α from the departure point to the virtual destination as 19 minutes (2 minutes+3 minutes+2 minutes+3 minutes+5 minutes+3 minutes+1 minute), and may calculate the return path driving time as 20 minutes (19 minutes+1 minute), based on the needed time β (1 minute) from the virtual destination to the departure point.

Figure 4C:
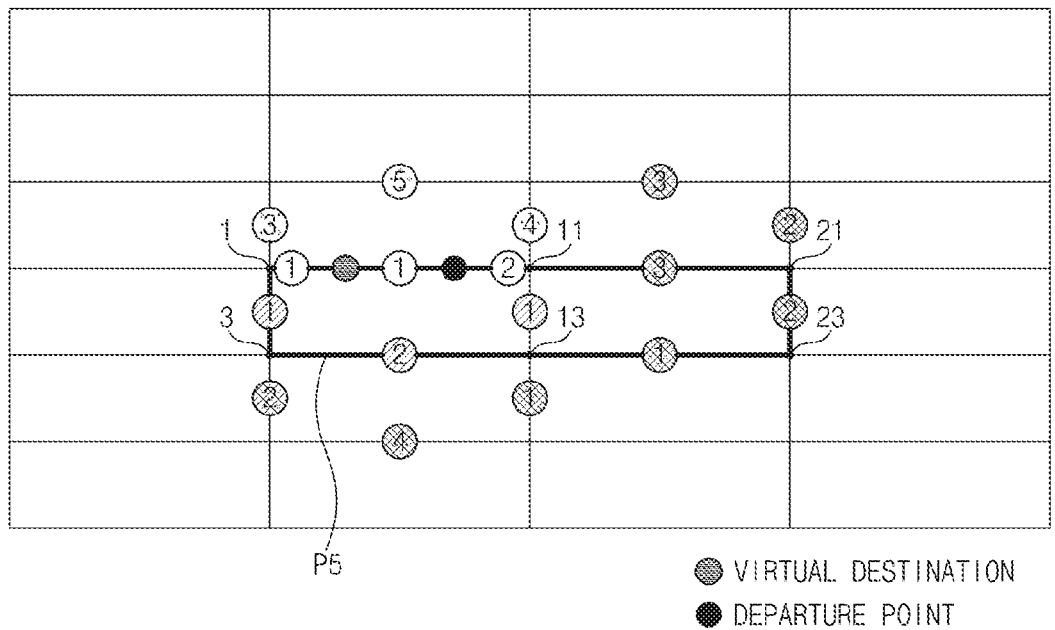

In addition, as illustrated in FIG. 4C, the controller 140 may set a return path P5 that extends a link without turning at the second intersection 11 that first meets after the driving starts from the departure point, turns in the second direction (south direction) at the third intersection 21 that first meets after the link is extended, turns in the third direction (west direction) at an eleventh intersection 23 that meets after the turning in the second direction, extends a link without turning at the sixth intersection 13 after turning in the third direction, turns in the first direction (north direction) at the seventh intersection 3 that meets after the link is extended, turns in the fourth direction (east direction) at the first intersection 1 that meets after the turning in the first direction, and then returns to the departure point via the virtual destination after the turning in the fourth direction. In this case, the controller 140 may calculate the sum of the needed time α from the departure point to the virtual destination and the needed time β from the virtual destination to the departure point. According to an embodiment, the controller 140 may calculate the needed time α from the departure point to the virtual destination as 12 minutes (2 minutes+3 minutes+2 minutes+1 minute+2 minutes+1 minute+1 minute), and may calculate the return path driving time as 13 minutes (12 minutes+1 minute), based on the needed time β (1 minute) from the virtual destination to the departure point.

The controller 140, when the time (the return path driving time) for driving the return path that is set to drive by turning at the intersection that first meets after the driving starts from the departure point as illustrated in FIGS. 3A and 3B is less than the return need time, may reset the path from the departure point to the virtual destination by extending the link and may recalculate the needed time from the departure point to the virtual destination, as shown in FIGS. 4A to 4C. In addition, the controller 140 may calculate the return path driving time as described in the above-described embodiment, and may provide the set path P4 as a final path when the return path driving time is the same as the return need time input by the user (refer to FIG. 4B).

Figure 5:
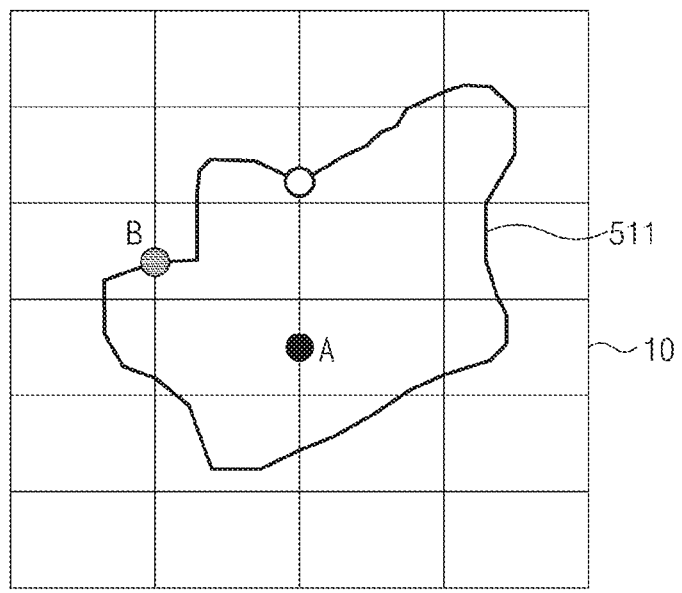
FIGS. 5 and 6 are diagrams illustrating an operation of an apparatus for providing a driving path according to another embodiment of the present disclosure.
Figure 6:
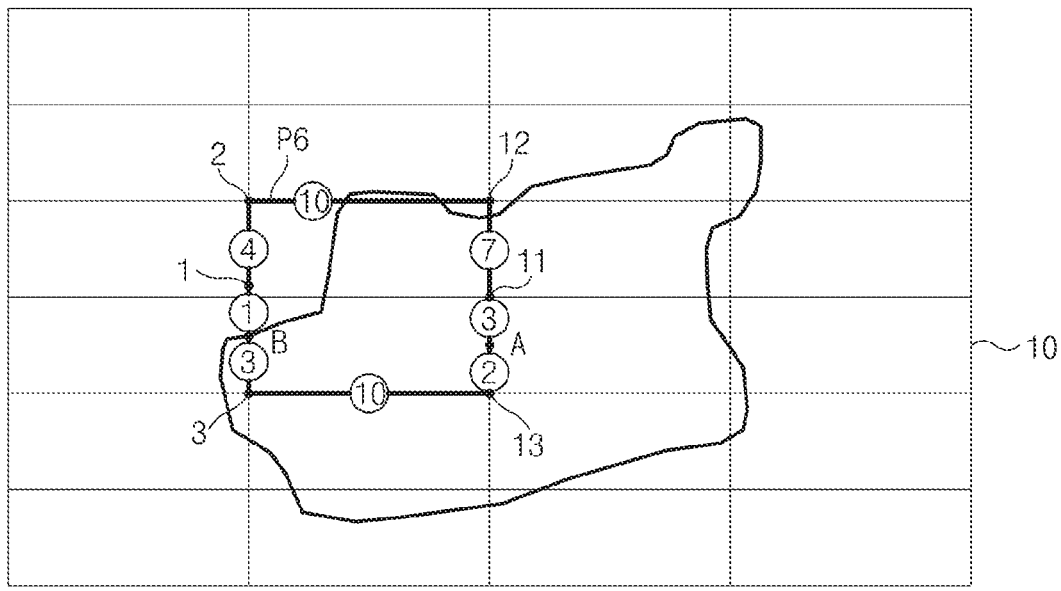

On the other hand, the controller 140 may determine whether the return need time to the departure point that is input by the user exceeds the preset time, and may provide the driving path as illustrated in FIGS. 5 and 6, when the return need time exceeds the preset time.

FIGS. 5 to 6 are diagrams illustrating an operation of an apparatus for providing a driving path according to another embodiment of the present disclosure.

As illustrated in FIG. 5, the controller 140 may set a position of the departure point on the link 10, may extract points 511 reachable within a predetermined time from α departure point A, and may set a virtual destination B at one of the reachable points 511. According to an embodiment of the present disclosure, the controller 140 may set the virtual destination at the shortest distance from the departure point among the points reachable within the predetermined time from the departure point. In this case, the predetermined time may mean a value obtained by dividing the return need time by 'n' (where 'n' is natural number). However, when a one way road is included in the link that connects one point of the shortest distance from the departure point, the controller 140 may not set the virtual destination at that point. In this case, the virtual destination B may serve as the waypoint when returning to the departure point A. A more detailed description will be described with reference to FIG. 6.

FIG. 6 describes how to set up the return path by extending the link according to an embodiment of the present disclosure when the time (return path driving time) for driving the return path that is set to drive by turning at the intersection that first meets after the driving starts from the departure point is less than the return need time.

As illustrated in FIG. 6, the controller 140 may set a return path P6 that extends a link without turning at the second intersection 11 that first meets after the driving starts from the departure point A, turns in the third direction (west direction) at the fourth intersection 12 that first meets after the extending of the link, turns in the second direction (south direction) at the fifth intersection 2 that first meets after the turning in the third direction, drives an extended link without turning at the first intersection 1 that first meets after turning in the second direction, turns in the fourth direction (east direction) at the seventh intersection 3 that meets after the driving the extended link, turns in the first direction (north direction) at the sixth intersection 13 that meets after the turning in the fourth direction, and then returns to the departure point A via the virtual destination B after the turning in the first direction. In this case, the controller 140 may calculate the sum of the needed time from the departure point A to the virtual destination B and the needed time from the virtual destination B to the departure point A. According to an embodiment, the controller 140 may calculate the needed time $\alpha$ from the departure point A to the virtual destination B as 25 minutes (3 minutes+7 minutes+10 minutes+4 minutes+1 minute), and may calculate the needed time $\beta$ from the virtual destination B to the departure point A as 15 minutes (3 minutes+10 minutes+2 minutes). Therefore, the controller 140 may calculate the return path driving time as 40 minutes (25 minutes+15 minutes).

When the return need time input by the user is 40 minutes and the return path driving time is 40 minutes as described above, the controller 140 may determine that the return path driving time is the same as the return need time input by the user, and may provide the set path P6 as the final path.

Figure 7:
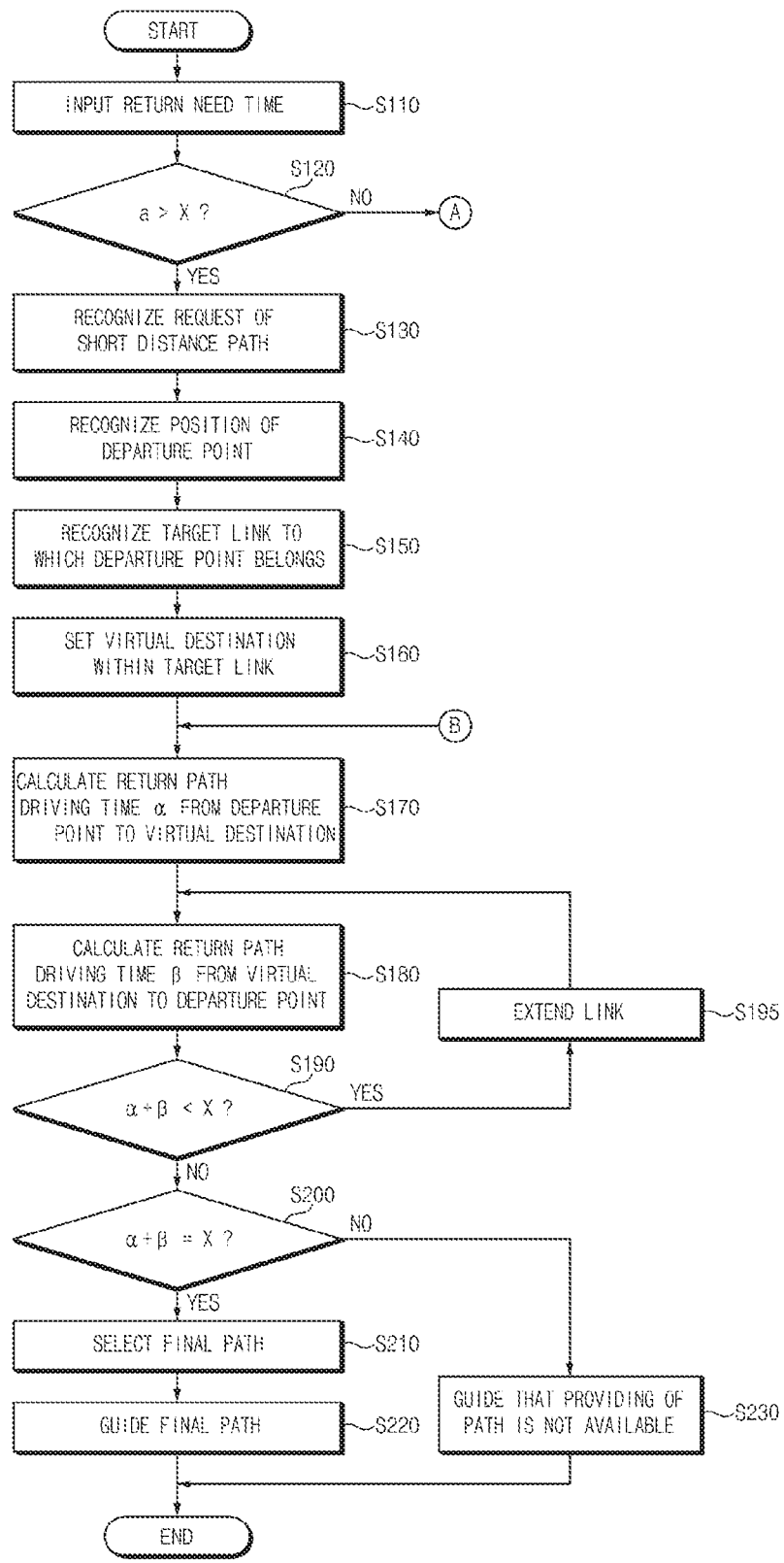
FIGS. 7 and 8 are flowcharts describing a method for providing a driving path according to an embodiment of the present disclosure.
Figure 8:
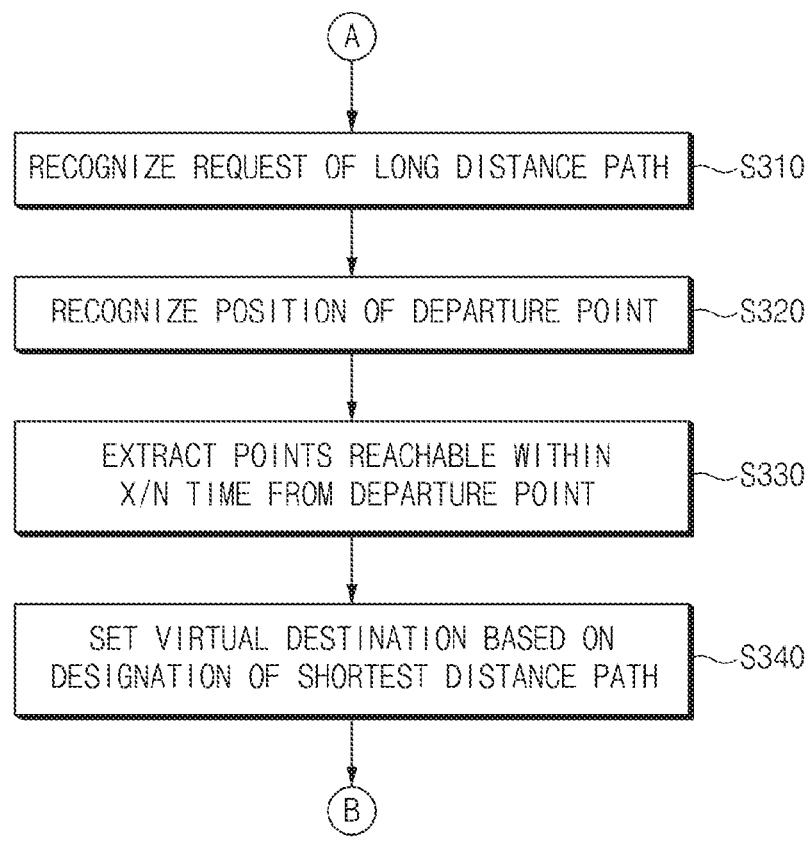

FIGS. 7 and 8 are flowcharts describing a method for providing a driving path according to an embodiment of the present disclosure.

As illustrated in FIG. 7, the controller 140 receives a return need time 'X' to the departure point from the user (S110), and determines whether the received return need time 'X' is less than the preset time 'a' (S120). When the controller 140 determines that the return need time 'X' is less than the preset time 'a' in S120 (YES), the controller 140 may recognize that the user requests a short distance path (S130).

When the controller 140 recognizes that the user requests the short distance path, the controller 140 may recognize the departure point by using the navigation 130 (S140), and may recognize a link including the departure point (S150). The controller 140 may set the virtual destination in the link recognized in S150 (S160). According to an embodiment, in S160, the controller 140 may set the virtual destination at a position spaced a predetermined distance away from the departure point in a direction opposite the driving direction of the vehicle.

The controller 140 calculates the needed time $\alpha$ for driving the return path that is set to drive to the virtual destination by turning at the intersection that first meets after the driving starts from the departure point (S170). In addition, the controller 140 calculates the needed time $\beta$ for driving the return path from the virtual destination to the departure point that is set to drive by turning at the intersection that first meets (S180).

In addition, the controller 140 calculates the sum of the needed time ($\alpha$, $\beta$) calculated in S170 and S180 as the return path driving time, and determines whether the return path driving time is less than the return need time input from the user in S110 (S190). When the controller 140 determines that the return path driving time is less than the return need time in S190 (YES), the controller 140 extends the link such that the return path to the virtual destination does not drive by turning at the intersection that first meets after the driving starts from the departure point (S195). In S195, the controller 140 extends the link to reset the return path, and recalculates the needed time $\alpha$ for driving the reset return path.

When the controller 140 determines that the return path driving time is not less than the return need time in S190 (NO), the controller 140 determines whether the return path driving time is equal to the return need time (S200). When the controller 140 determines that the return path driving time is the same as the return need time in S200 (YES), the controller 140 selects the return path that has the driving time equal to the return need time (S210), and provides the selected return path to the final path (S220). In S220, the controller 140 may control not to display the virtual destination. On the other hand, when the controller 140 determines that the return path driving time is not the same as the return need time in S200 (NO), the controller 140 may determine that the return path driving time exceeds the return need time. In this case, the controller 140 may advise that the return path to the departure point cannot be provided.

In addition, when the controller 140 determines that the return need time is not less than the preset time in S120 (NO), that is, the return need time exceeds the preset time, as illustrated in FIG. 8, the controller 140 may recognize that the user requests a long distance path (S310). When the controller 140 recognizes that the user requests the long distance path, the controller 140 may recognize the departure point by using the navigation 130 (S320), and may extract points reachable within a predetermined time from the departure point (S330). In S330, the predetermined time may be a value obtained by dividing the return need time by 'n' (where 'n' is natural number).

The controller 140 may set the virtual destination at any one of the points extracted in S330 (S340). In S340, the controller 140 may set the virtual destination at the shortest distance from the departure point among the points reachable within the predetermined time from the departure point. In this case, when a one way road is included in the link connecting one point of the shortest distance from the departure point, the controller 140 may control not to set the virtual destination at that point.

As set forth above, because the apparatus for providing a driving path according to an embodiment of the present disclosure may search for and provide a driving path for returning back to the departure point after a preset time, it is possible to return to the departure point accurately after the preset time elapses, and a driving convenience of a user may be improved.

The above description is merely illustrative of the spirit of the present disclosure, and those skilled in the art to which the present disclosure pertains may make various modifications and variations without departing from the spirit and scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle that includes an apparatus for providing a driving path of the vehicle, the apparatus comprising:
an input device located within the vehicle and configured to receive a return need time from a user within the vehicle, the return need time indicating a time when driver needs to travel from a departure point and return to the departure point;
a GPS receiver located within the vehicle; and
a controller configured to:
determine whether the return need time is less than a preset time,
set a virtual destination depending on a result of the determination,
calculate a first driving time from the departure point to the virtual destination and a second driving time from the virtual destination to the departure point, the first and second driving times being calculated based on a map image and position information of the vehicle received by the GPS receiver,
compare a sum of the first driving time and the second driving time with the return need time,
determine whether to provide a return path to the departure point based on a result of the comparison,
provide the return path to the departure point when the sum of the first driving time and the second driving time is the same as the return need time, wherein the return path comprises a first path in which driving is performed during the first driving time from the departure point to the virtual destination and a second path in which driving is performed during the second driving time from the virtual destination to the departure point, and
recalculate the first driving time by updating the a first path until the sum of the first driving time and the second driving time is the same as the return need time when the sum of the first driving time and the second driving time is less than the return need time.

2. The vehicle of claim 1, wherein the controller is configured to advise that the return path cannot be provided to the departure point when the sum of the first driving time and the second driving time exceeds the return need time.

3. The vehicle of claim 1, wherein the controller is configured to reset the return path by assigning a user preference as a weight.

4. The vehicle of claim 1, further comprising a steering wheel, wherein the input device is provided on the steering wheel.

5. The vehicle of claim 1, wherein the controller is configured to detect a driving direction at the departure point, determine a direction opposite to the driving direction and set the virtual destination at a position spaced apart from the departure point by a predetermined distance in the direction opposite the driving direction when the return need time is less than the preset time;
wherein the controller is configured to set the virtual destination at one of multiple points reachable within a predetermined time from the departure point when the return need time exceeds the preset time, wherein the predetermined time is less than or equal to the return need time; and
wherein the controller is configured to set a point located at a shortest distance from the departure point among the multiple points reachable within the predetermined time from the departure point as the virtual destination.

6. The vehicle of claim 1, wherein the return path is determined taking into account a user preference.

7. A method, performed by a navigation apparatus of a vehicle, for providing a driving path for the vehicle leaving a departure point and then returning to the departure point at a later time, the method comprising:
receiving a return need time to the departure point;
determining whether the return need time is less than a preset time;
setting a virtual destination depending on a result of the determination, the virtual destination being set based on a map image and GPS information;
calculating a first driving time of the vehicle from the departure point to the virtual destination and a second driving time of the vehicle from the virtual destination to the departure point;
comparing a sum of the first driving time and the second driving time with the return need time;
determining whether to provide a return path to the departure point based on a result of the comparison;
providing the return path to the departure point when the sum of the first driving time and the second driving time is the same as the return need time;
recalculating the first driving time and updating a first path from the departure point to the virtual destination during the first driving time when the sum of the first driving time and the second driving time is not the same as the return need time; and
recalculating the second driving time and updating a second path from the virtual destination to the departure point during the second driving time when the sum of the first driving time and the second driving time is not the same as the return need time.

8. The method of claim 7, wherein comparing the sum of the first driving time and the second driving time with the return need time includes advising that the return path cannot be provided to the departure point when the sum of the first driving time and the second driving time exceeds the return need time.

9. The method of claim 7, further comprising resetting the return path by assigning a user preference as a weight.

10. The method of claim 7, further comprising:
driving the vehicle from the departure point to the virtual destination along the first path; and
driving the vehicle from the virtual destination to the departure point along the second path.

11. The method of claim 10, wherein the vehicle is driven from the departure point to the virtual destination after dropping a passenger at the departure point.

12. The method of claim 11, wherein the vehicle is driven from the virtual destination to the departure point in order to pick up the passenger.

13. The method of claim 7, further comprising using a GPS receiver of the vehicle to determine the GPS information.

14. The method of claim 7, wherein:
setting the virtual destination includes detecting a driving direction at the departure point, determining a direction opposite to the driving direction and setting the virtual destination at a position spaced apart from the departure point by a predetermined distance in the direction opposite the driving direction when the return need time is less than the preset time;

setting the virtual destination includes setting the virtual destination at one of multiple points reachable within a predetermined time from the departure point when the return need time exceeds the preset time, wherein the predetermined time is less than or equal to the return need time; and setting the virtual destination includes setting as the virtual destination a point located a shortest distance from the departure point among the multiple points reachable within the predetermined time from the departure point.

15. The method of claim 7, wherein the return path is determined taking into account a user preference.

16. A method of operating a vehicle, the method comprising:

delivering a passenger in the vehicle to a departure point;

providing a return need time to the departure point to a navigation apparatus on-board the vehicle so that the navigation apparatus performs the steps of:

determining whether the return need time is less than a preset time;

setting a virtual destination depending on a result of the determination;

calculating a first driving time from the departure point to the virtual destination and a second driving time from the virtual destination to the departure point, the first and second driving times being calculated based on a map image and GPS position information indicating a position of the vehicle;

determining a return path to the departure point based when a sum of the first driving time and the second driving time corresponds to the return need time, the return path including a first path from the departure point to the virtual destination and a second path from the virtual destination to the departure point;

driving the vehicle from the departure point to the virtual destination along the first path, wherein the navigation apparatus recalculates the first driving time while the vehicle is being driven from the departure point to the virtual destination and adjusts the first path if the sum of the first driving time and the second driving time is not the same as the return need time;

driving the vehicle from the virtual destination to the departure point along the second path, wherein the navigation apparatus recalculates the first driving time while the vehicle is being driven from the virtual destination to the departure point and adjusts the second path if a time remaining to arrive at the departure point will cause the vehicle to arrive at a time other than the return need time; and after driving the vehicle from the virtual destination to the departure point, picking up the passenger in the vehicle at the departure point.

17. The method of claim 16, wherein comparing the sum of the first driving time and the second driving time with the return need time includes advising that the return path cannot be provided to the departure point when the sum of the first driving time and the second driving time exceeds the return need time.

18. The method of claim 16, further comprising using a GPS receiver of the vehicle to determine the GPS position information.

19. The method of claim 16, wherein setting the virtual destination includes detecting a driving direction at the departure point, determining a direction opposite to the driving direction and setting the virtual destination at a position spaced apart from the departure point by a predetermined distance in the direction opposite the driving direction when the return need time is less than the preset time;

wherein setting the virtual destination includes setting the virtual destination at one of multiple points reachable within a predetermined time from the departure point when the return need time exceeds the preset time, wherein the predetermined time is a time less than or equal to the return need time; and wherein setting the virtual destination includes setting as the virtual destination a point located a shortest distance from the departure point among the multiple points reachable within the predetermined time from the departure point.

20. The method of claim 16, wherein the return path is determined taking into account a user preference.

* * * * *